Sept. 2, 1930.  B. C. RIBLET  1,774,670
LANDING AND LAUNCHING WAYS
Filed June 17, 1929  3 Sheets-Sheet 1
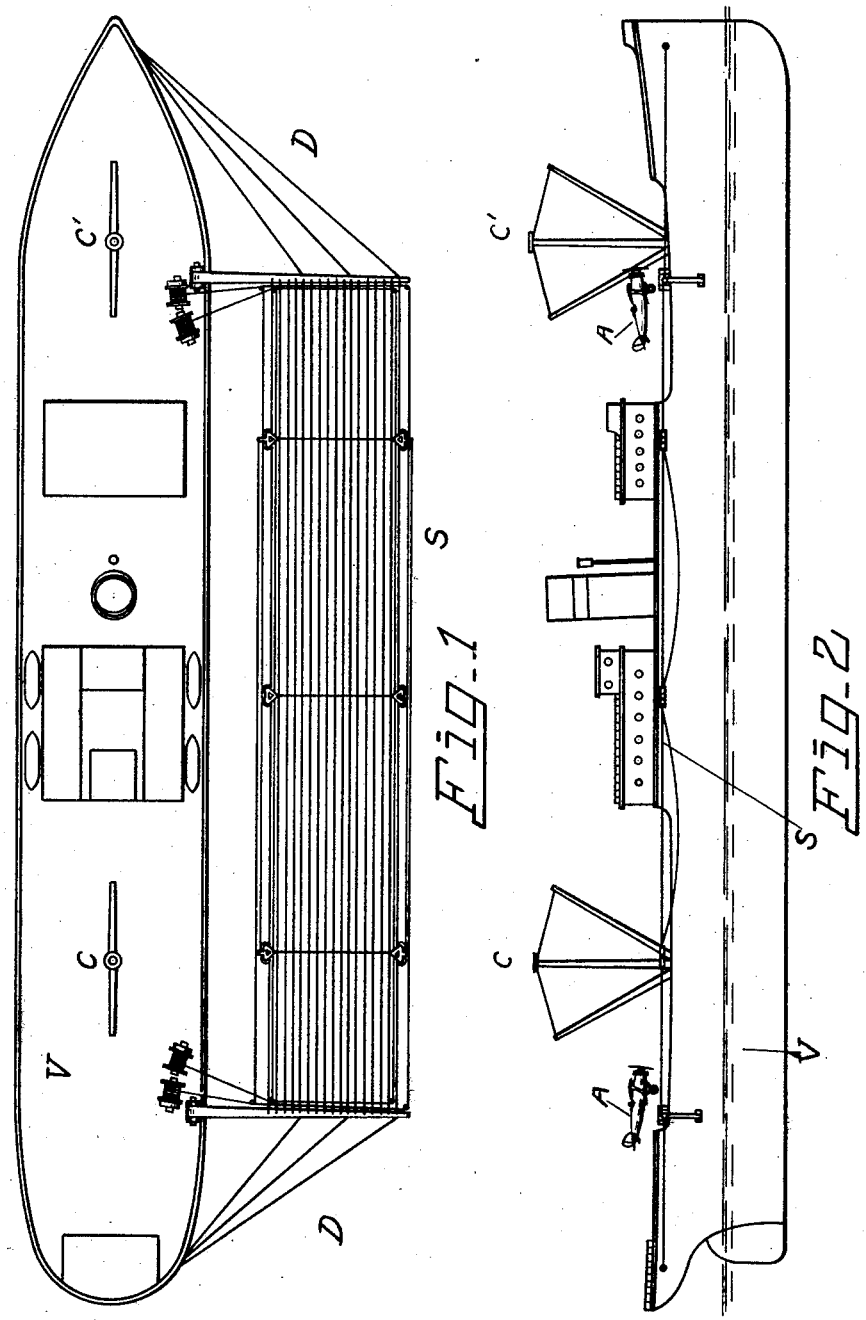
BYRON C. RIBLET Inventor
By Herbert E. Smith
Attorney Sept. 2, 1930.  B. C. RIBLET  1,774,670
LANDING AND LAUNCHING WAYS
Filed June 17, 1929   3 Sheets-Sheet 2

BYRON C. RIBLET, Inventor
By Herbert E. Smith, Attorney

Sept. 2, 1930. B. C. RIBLET 1,774,670
LANDING AND LAUNCHING WAYS
Filed June 17, 1929  3 Sheets-Sheet 3
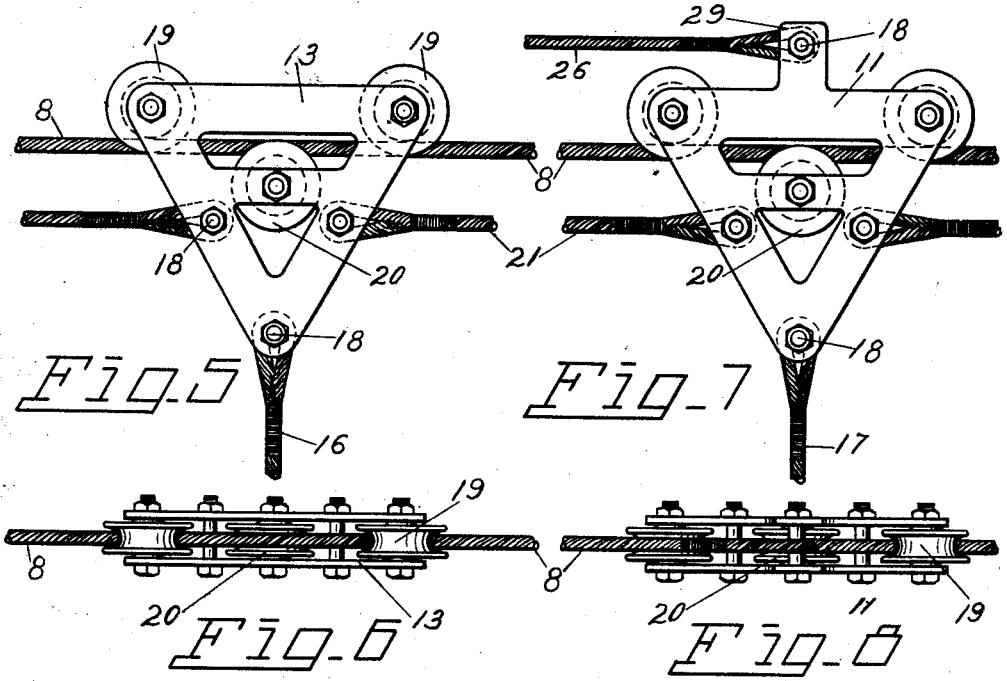
BYRON C. RIBLET  Inventor
By Herbert E. Smith
Attorney Patented Sept. 2, 1930

1,774,670

UNITED STATES PATENT OFFICE

BYRON C. RIBLET, OF SPOKANE, WASHINGTON

LANDING AND LAUNCHING WAYS

Application filed June 17, 1929. Serial No. 371,660.

My present invention relates to improvements in landing and launching ways for aeroplanes and other aircraft, which ways while well adapted for use upon land, are especially designed for marine equipment as hereinafter referred to and as illustrated in the accompanying drawings. In the exemplification herein described, the landing way is employed in connection with a ship, as an aeroplane carrier, but it will be understood that the landing and launching way is applicable for use in any appropriate place where the available field is limited in area.

In carrying out my invention in combination with a ship I employ one or more folding or foldable landing ways in the form of nets, at the starboard and port sides of the ship and means are provided whereby these landing ways may be swung to outboard position for use and to inboard position when not to be used.

The landing and launching ways are fashioned as skeleton frames upon which the aeroplane may alight and over which the aircraft is adapted to move, under its landing momentum, along the way and in frictional contact therewith, and means are provided in combination with the way for gradually retarding and stopping the forward movement of the aircraft as it skids or glides along the way. Means are also provided whereby the aeroplane, when launched from the way and getting under way thereover under its own propulsion, is assisted in the take-off and this launching means also compensates for and overcomes the friction that would otherwise retard the take-off of the air craft.

In the exemplified structure it is contemplated that the landing wheels of the aircraft will not be called upon to perform their usual functions in alighting on and taking off from the way, but it will be understood that the auxiliary stopping means and the auxiliary starting means for landing and launching an aircraft may be utilized in combination with other types of ways, platforms, or landing fields.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention. Changes and alterations are contemplated in the illustrated structures, and such changes within the scope of my claims may be made without departing from the principles of my invention.

Figure 1 is a plan view of a ship equipped at its starboard side with a landing way and auxiliary parts embodying my invention with the way in outboard position for use.

Figure 2 is a view in side elevation of the ship and equipment illustrating an airplane at the bow in take-off position and an airplane at the stern in landing position, with relation to the way.

Figure 5 is an enlarged plan view of one of a pair intermediate guide carriages, with its cable connections.

Figure 6 is a top plan view of the carriage of Figure 5.

Figure 7 is a top plan view of one of a set of four end carriages; and Figure 8 is an edge view of the carriage of Fig. 7.

In order that the general assembly and arrangement of parts may readily be understood I have shown a ship or vessel V having a foldable starboard way S and port way P, each of which has fore and aft anchoring cables D to brace them against longitudinal strains. In their outboard positions the ways are braced by the use of braces B that impinge against the sides of the ship, and cranes C and C' at the fore and aft ends of the foldable ways are utilized in connection with suitable hoisting machinery and cables for swinging the ways to outboard and inboard position.

In Figure 2 an airplane A is represented as launching or taking off from the bow end of the way and another plane A' is in position at the stern for landing on the way, the traction wheels W of the aircraft not being used for their usual purposes in landing and launching the aircraft, as will be explained.

Figure 3:
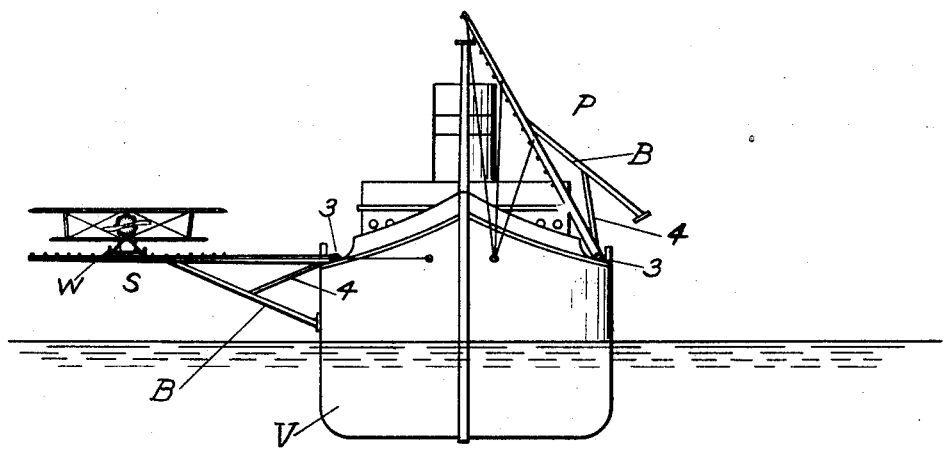
Figure 3 is a view at the bow of the ship showing the starboard way in outboard position and an airplane thereon, and a port way in inboard position.

The landing way includes a pair of beams 1 and 2 spaced as far apart as feasible on the ship, and hinged at 3, 3, near the bow and stern of the ship so that way may swing laterally on these hinges to outboard and inboard positions, and struts 4 are used between the beams and braces B for insuring a rigid, laterally projecting way-frame at the fore and aft ends of the way as seen in Figure 3.

Between the two way beams are arranged a series of strong cables 5 that are anchored to the beams by bolts 6, and these cables, which extend fore and aft of the ship, are spaced apart a suitable distance to permit the traction wheels W of the aircraft to project downwardly through the spaces between pairs of cables. The cables are also designed to support the aircraft as it glides thereover in landing or alighting, as well as to support the aircraft as it glides over the way in taking off.

The aircraft may alight while traveling forward in the direction of movement of the ship and take off in the same direction while the ship is under way, or the aircraft may land or alight at the forward end of the way and travel aft as it is being stopped, or the take off may be made from the stern end of the way if necessary.

The outer and inner cables of the parallel series, indicated as 7 and 8 are utilized as guides or tracks for four end carriages 9, 10, 11, and 12, and two intermediate guide carriages 13 and 14, said carriages being adapted to travel forward and aft with relation to the way and connected in pairs by cross cables 15, 16, and 17. These cross cables are detachably fastened, as by bolts 18 to the respective carriages and they extend at right angles to the way-cables 5 and over them as indicated.

The carriages are each provided with a pair of grooved wheels 19, 19, at the outer side of the guide cable and a single grooved wheel 20 at the inner side of the guide cable so that the carriages may readily roll along with the cross cables in either direction when the aircraft is landing or taking off.

Figure 4:
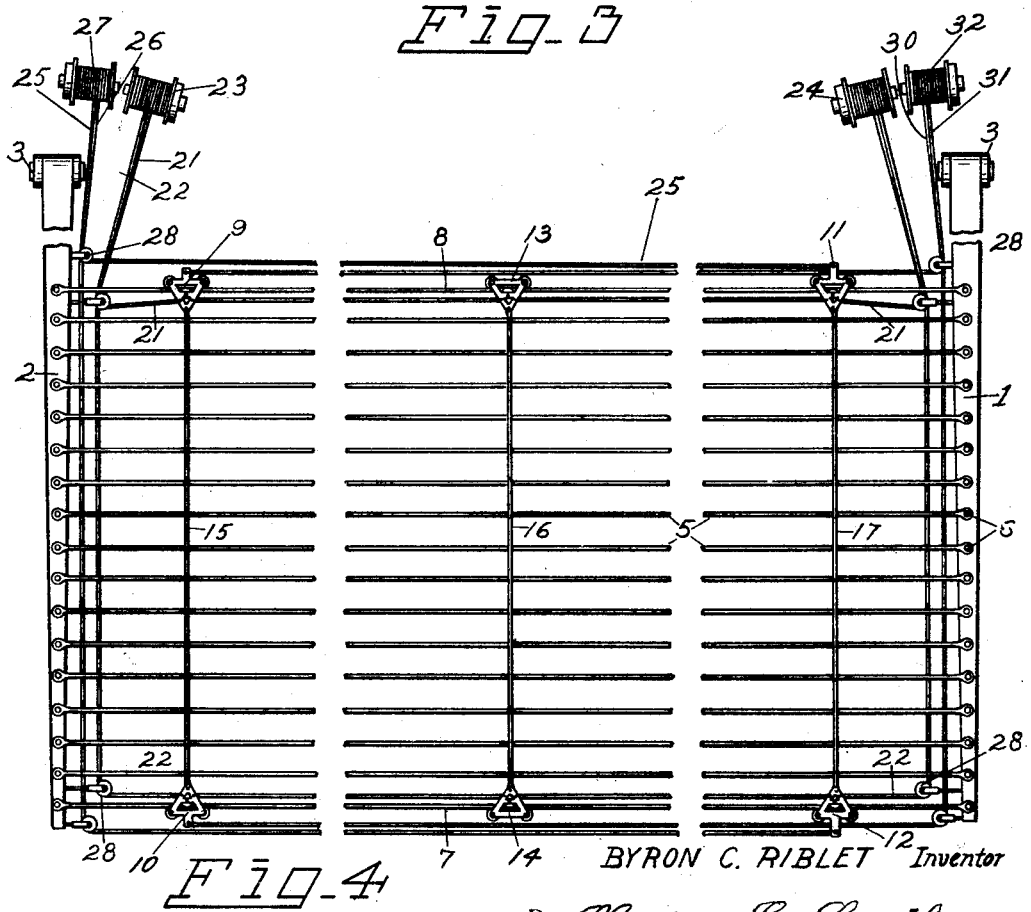
Figure 4 is a plan view of a foldable way, in landing position for an aeroplane and the retarding and stopping means ready for operation.

As best shown in Figure 4 it will be seen that two cables 21 and 22 have their ends in pairs wound upon the respective drums 23 and 24, which drums are journaled to revolve in suitable bearings and located at the aft and fore ends of the way, but supported in stationary positions as from the ship V.

Winding mechanism and braking mechanism are provided for each drum, the former being employed on one drum and the latter being utilized on the other drum when an aircraft is taking off. When an aircraft is alighting the application of the winding mechanism and of the braking mechanism is reversed in relation to the two drums.

A second pair of cables 25 and 26 have their ends in pairs wound upon a drum 27, pass around guide pulleys 28, and have their respective ends attached by bolts, as at 18, to lugs 29 on the respective end carriages 11 and 12.

A third pair of cables 30 and 31 have their ends in pairs wound upon a drum 32, pass around guide pulleys, as 28, and are attached by bolts 18 to the lugs 29 of the respective carriages 9 and 10.

The cables 21 and 22 pass around guide pulleys 28 mounted on the beams of the way and form a rectangle about the edges of the way, the row of three carriages at the outer and inner sides of the way forming joints in these cables.

The cables 25 and 26 extend from their drum 27 at the stern end of the way to the two forward carriages 11 and 12 at the bow end of the way. The cables 30 and 31 extend from their drum 32 at the bow end of the way to the aft carriages 9 and 10 at the remote end of the way.

Referring to Figure 4 and assuming that an airplane is to alight on the way, the four drums are properly manned and ready for manipulation. The aircraft alights on the way to the left of cross cable 15 with its wheels W between spaces formed by spaced pairs of cables 5 and glides over these cables until it strikes the first cross cable 15 which gives with the impact and the cross cable is pushed to the right, being guided by the carriages 9 and 10. The brakes are applied to drum 23 and drum 24 is wound to take up the slack of chains or cables 21 and 22; drum 32 is wound to take up slack in cables 30, 32; and cables 25 and 26 and drum 27 remain idle. By the retarding action of the cross cable 15 the aircraft is stopped before the carriages 11 and 12 reach the right end of their travel. The same result is accomplished in the same manner if the aircraft should first alight between cables 15 and 16, or between cables 16 and 17, and then impinge against the nearest cable 16 or 17.

If the aircraft alights at the bow end of the way and is traveling toward the stern, it might encounter any one of the cables 17, 16 or 15, in which case the carriages travel or roll toward the stern, the brake is applied to drum 24, drum 23 winds in the slack of cables 21, 22, and drum 27 winds in the slack of cables 30 31.

When an aircraft is to be launched it is placed in position, as at the stern end of the deck with its wheels W in spaces between spaced pairs of cables 5, and resting on the cables 5, back of the aft cable 15. Cross cables 16 and 17 may be removed to clear the space of the way in front of the aircraft which is started of course under its own power. Drum 24 is rapidly revolved to wind cables 21 and 22 and drum 32 is also rapidly revolved to wind cables 30 and 31, drums 23 and 27 being allowed to run free. The starting 15 at the rear of the aircraft pulls or pushes against the aircraft as an auxiliary means for giving the airship the necessary lift for its take off so that it will clear the forward end of the way.

While I have employed nautical terms for convenience in describing the construction and operation of the embodiment of my invention it will be understood that the foldable way may be used for purposes other than nautical or marine; the auxiliary stopping and starting mechanism may be used with a folding way, or with a stationary way, and the auxiliary mechanism may be used with landing and launching ways or platforms of other types of construction.

Having thus fully described my invention what I claim as new and desire to secure by Letters Patent is—

1. A foldable landing way for aeroplanes and means for folding said way, means arranged transversely of the way for retarding a landing airplane or for forwardly moving a launching airplane, mechanism for controlling the retardation of an airplane and means for alternately operating the launching means.

2. The combination with a folding landing way and operating means therefor, of a transversely disposed stopping or starting member and guides therefor, and means alternately operable in connection with the member for retarding said member and for moving said member.

3. The combination with a landing way over which an airplane is adapted to glide, of a transversely disposed, movable, stopping or starting member and guides therefor, and means alternately operable in connection with said member for retarding said member and for moving said member.

4. The combination with a landing way comprising spaced, parallel, longitudinally extending cables, of a transversely disposed cable and carriages therefor, and means connected with said cable alternately operable for retarding said transversely disposed cable and for moving said cable.

5. The combination with a pair of spaced, hinged beams and parallel, longitudinally extending cables connecting said beams, of a transversely disposed cable and carriages therefor on a pair of the longitudinally extending cables, and means connected with the carriages alternately operable for retarding the movement of the carriages or for moving said carriages.

6. The combination with a landing way, of a pair of laterally disposed carriages and a cross cable connecting them, a pair of cables connected to the carriages and winding drums for the paired ends of said cables, guides for the pair of cables, means for revolving said drums and means for braking said drums.

7. The combination with a landing way comprising parallel, spaced, longitudinally extending cables and end-anchoring means therefor, of a pair of side carriages and a cross cable connecting said carriages, a pair of cables connected to the carriages and winding mechanism for the paired ends of said cables, means for operating the winding mechanism and means for braking said mechanism.

8. The combination with a landing way, of a pair of side carriages and a cross cable connecting said carriages, a pair of cables connected at opposite sides of the carriages and a winding drum for the paired ends of said cables, brakes for the drums, a second pair of cables having their outer ends connected to the carriages and a drum for the inner ends of said cables, and means for braking said drum.

9. The combination with a landing way comprising spaced, parallel, longitudinally extending cables and end-anchoring means, of a pair of side carriages having rollers guided on the two outermost cables and a cross cable connecting said carriages, a pair of cables connected at opposite sides of said carriages and winding drums for the paired ends of said cables, means for revolving the drums and brakes for said drums, a second pair of cables connected at one side of the carriages, a drum for the paired ends of the second pair of cables, means for revolving the latter drum and a brake for this drum.

In testimony whereof I affix my signature.

BYRON C. RIBLET.